R. B. SNOW.
EYEGLASS CASE.
APPLICATION FILED MAY 22, 1915.
1,190,030.
Patented July 4, 1916.
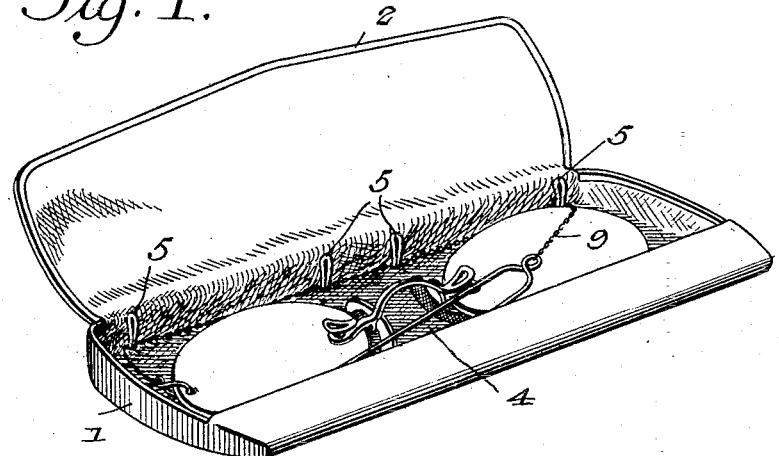
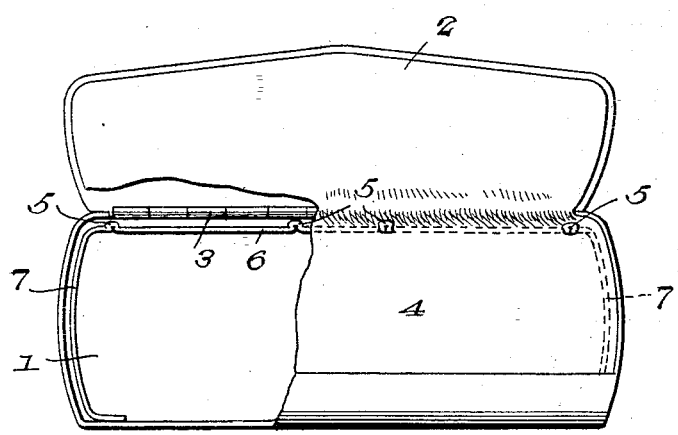
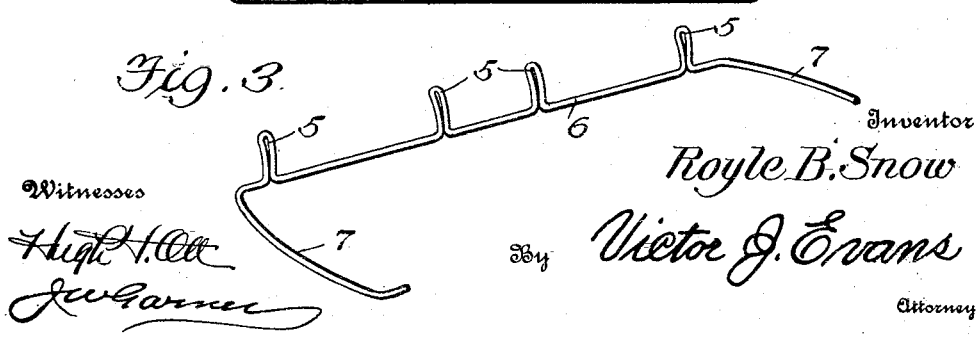
Witnesses
Inventor
Royle B. Snow
By Victor J. Evans
Attorney

UNITED STATES PATENT OFFICE.

ROYLE B. SNOW, OF JUDDHAVEN, ONTARIO, CANADA.

EYEGLASS-CASE.

1,190,030.

Specification of Letters Patent.

Patented July 4, 1916.

Application filed May 22, 1915. Serial No. 29,859.

*To all whom it may concern:*

Be it known that I, ROYLE B. SNOW, a citizen of Canada, residing at Juddhaven, in the Province of Ontario and Dominion of Canada, have invented new and useful Improvements in Eyeglass-Cases, of which the following is a specification.

This invention relates to improvements in eyeglass cases and especially with reference to the provision of means in an eyeglass case to hold the chain and prevent the chain from becoming tangled with the nose piece or other delicate parts of the eyeglasses, the object of the invention being to provide improved guard devices in the eyeglass case which are cheap and simple in construction and which may be readily arranged in place in the case between the bottom and the lining.

The invention consists in the combination and arrangement of devices hereinafter described and claimed.

In the accompanying drawings, Figure 1 is a perspective view of an eyeglass case constructed in accordance with my invention, showing the case open and the guard projection thereof engaging and holding the chain of a pair of eyeglasses to keep the chain from tangling. Fig. 2 is a plan of the case, open and with a portion of the velvet lining of the bottom removed. Fig. 3 is a detail perspective view of the guard or holder for the eyeglass chain, removed from the case.

For the purpose of this specification an eyeglass case of usual construction is here shown the body of the case being indicated at 1 the top at 2, the hinge joint at 3 and a lining of velvet or other suitable material at 4.

In accordance with my invention I provide a guard or holder which embodies a series of projections 5 that are arranged in the body of the case, near the back extending from the bottom thereof and are sufficiently long to cause their points to be engaged by the lining in the cover, when the cover is closed. These projections are here shown as bent from and formed integrally with a guard wire 6 which is a spring wire, substantially U-shaped in form and which is arranged between the bottom of the case and the velvet lining of the bottom with the projections extending through the openings in the bottom lining, the said intermediate portion 6 of the wire guard being arranged parallel with the back of the case and the arms 7 thereof being curved and arranged in the ends of the case.

When the eyeglasses are placed in the case, the chain 9 is arranged between the projections and the back of the case, the projections serving to keep the chain from becoming tangled and from coming in contact with the nose piece or other delicate parts of the glasses. When the cover is closed it engages the points of the projections and hence prevents the chain from slipping over them.

For a long chain to be used with the glasses it may be passed back and forth around and engaged with opposite sides of the projections, as is obvious so that the projections will serve to prevent the chain from tangling or coming in contact with portions of the eyeglasses.

Having thus described my invention I claim:—

1. In combination with a body, lining and hinged back of an eyeglass case, projections in the body spaced from the back thereof and of such length as to cause their points to be engaged by the cover when the cover is closed.

2. In combination with a body, hinged back and lining of an eyeglass case, a guard wire arranged in the bottom of the body between the bottom and the lining and provided with projections extending through openings in the bottom lining and arranged in spaced relation to the back of the case, said projections being of such length as to have their points engaged by the cover when the cover is closed.

3. In combination with a body, a hinged back and lining of an eyeglass case, a guard formed from a strand of wire and disposed between the lining and bottom of the case, said guard having curved arms located adjacent the ends of the case, and loops in the portion of the wire connecting the arms forming projections extending upwardly
5 through the lining and adapted to contact with the cover adjacent its connection with the body.

In testimony whereof I affix my signature in presence of two witnesses.

ROYLE B. SNOW.

Witnesses:
L. G. MURMESBER,
THOMAS L. SNOW.